US010408937B2

(12) United States Patent
Myers et al.

(10) Patent No.: US 10,408,937 B2
(45) Date of Patent: Sep. 10, 2019

(54) METAL BRIDGE DETECTION SYSTEMS AND METHODS

(71) Applicant: Ford Global Technologies, LLC, Dearborn, MI (US)

(72) Inventors: Scott Vincent Myers, Camarillo, CA (US); Ashley Elizabeth Micks, Mountain View, CA (US); Sneha Kadetotad, Cupertino, CA (US); Harpreetsingh Banvait, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 346 days.

(21) Appl. No.: 15/271,068

(22) Filed: Sep. 20, 2016

(65) Prior Publication Data

US 2018/0081057 A1 Mar. 22, 2018

(51) Int. Cl.
| B60R 1/00 | (2006.01) |
| G05D 1/02 | (2006.01) |
| B60W 30/00 | (2006.01) |
| G01C 21/26 | (2006.01) |
| G01C 21/28 | (2006.01) |
| G01C 21/30 | (2006.01) |

(Continued)

(52) U.S. Cl.
CPC ............ *G01S 17/08* (2013.01); *B60W 30/00* (2013.01); *G01C 21/28* (2013.01); *G01C 21/30* (2013.01); *G01S 13/862* (2013.01); *G01S 13/865* (2013.01); *G01S 13/867* (2013.01); *G01S 15/931* (2013.01); *G01S 17/936* (2013.01); *G01S 19/00* (2013.01); *G01S 19/48* (2013.01); *B60R 1/00* (2013.01); *B60R 2300/8093* (2013.01); *G01C 21/26* (2013.01); *G01S 2013/935* (2013.01); *G01S 2013/936* (2013.01); *G01S 2013/9342* (2013.01); *G01S 2013/9346* (2013.01); *G01S 2013/9357* (2013.01); *G01S 2013/9375* (2013.01); *G05D 1/024* (2013.01)

(58) Field of Classification Search
CPC ........ G01S 17/08; G01S 17/023; G01S 17/89; G01S 17/936; G01S 13/865; G01S 13/867; G01S 13/89; G01S 13/9357; G01S 2013/9342; G01S 2013/9346; G01S 2013/935
See application file for complete search history.

(56) References Cited

U.S. PATENT DOCUMENTS

| 6,662,106 | B2 | 12/2003 | Evans | |
| 6,711,493 | B1 * | 3/2004 | Andrews | ............. G08G 1/0104 340/903 |

(Continued)

FOREIGN PATENT DOCUMENTS

JP 2013020288 A 1/2013

*Primary Examiner* — Eric L Bolda
(74) *Attorney, Agent, or Firm* — David R. Stevens; Stevens Law Group

(57) ABSTRACT

Example metal bridge detection systems and methods are described. In one implementation, a method receives LIDAR data from a LIDAR system mounted to a vehicle and receives camera data from a camera system mounted to the vehicle. The method analyzes the received LIDAR data and the camera data to identify a metal bridge proximate the vehicle. If a metal bridge is identified, the method adjusts vehicle operations to improve vehicle control as it drives across the metal bridge.

18 Claims, 5 Drawing Sheets

(51) Int. Cl.
*G01S 13/86* (2006.01)
*G01S 13/93* (2006.01)
*G01S 15/93* (2006.01)
*G01S 17/08* (2006.01)
*G01S 17/93* (2006.01)
*G01S 19/48* (2010.01)
*G01S 19/00* (2010.01)

(56) References Cited

U.S. PATENT DOCUMENTS

| | | |
|---|---|---|
| 8,332,134 B2 | 12/2012 | Zhang |
| 9,187,099 B2 | 11/2015 | Powers |
| 2005/0134440 A1* | 6/2005 | Breed .................. B60N 2/2863 340/435 |
| 2008/0129541 A1* | 6/2008 | Lu ....................... G06K 9/00791 340/905 |
| 2010/0017128 A1* | 1/2010 | Zeng .................. B60W 40/105 701/301 |
| 2011/0043377 A1* | 2/2011 | McGrath ............ G08G 1/09675 340/905 |
| 2013/0018575 A1* | 1/2013 | Birken ............... G01B 11/2513 701/409 |
| 2014/0350838 A1* | 11/2014 | Hayashi ................ G01S 13/931 701/301 |
| 2016/0055750 A1 | 2/2016 | Linder |
| 2016/0252611 A1* | 9/2016 | Guecker .............. G01S 17/936 342/70 |
| 2016/0350907 A1* | 12/2016 | Simula .................. G06T 7/0004 |

* cited by examiner

METAL BRIDGE DETECTION SYSTEMS AND METHODS

TECHNICAL FIELD

The present disclosure relates to vehicular systems and, more particularly, to systems and methods that detect the presence of a metal bridge near a vehicle.

BACKGROUND

Automobiles and other vehicles provide a significant portion of transportation for commercial, government, and private entities. Vehicles, such as autonomous vehicles, drive on roadways that may have one or more bridges with different types of bridge surfaces. For example, some bridges have a metal roadway surface, such as a metal grate, on at least a portion of the bridge. The presence of a metal surface on the bridge presents a potential risk to the vehicle due to a loss of traction with the metal surface and a resulting loss of vehicle control. The metal surface, especially a metal grate, may cool faster than non-metal bridge surfaces and cause ice and snow to build-up on the metal grate sooner than surrounding roads and non-metal portions of the bridge. Thus, ice or snow on a metal surface presents a risk of injury to occupants of vehicles driving on the slippery metal surface. Detection of metal bridges can reduce the likelihood of accidents and potential injury to vehicle occupants.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
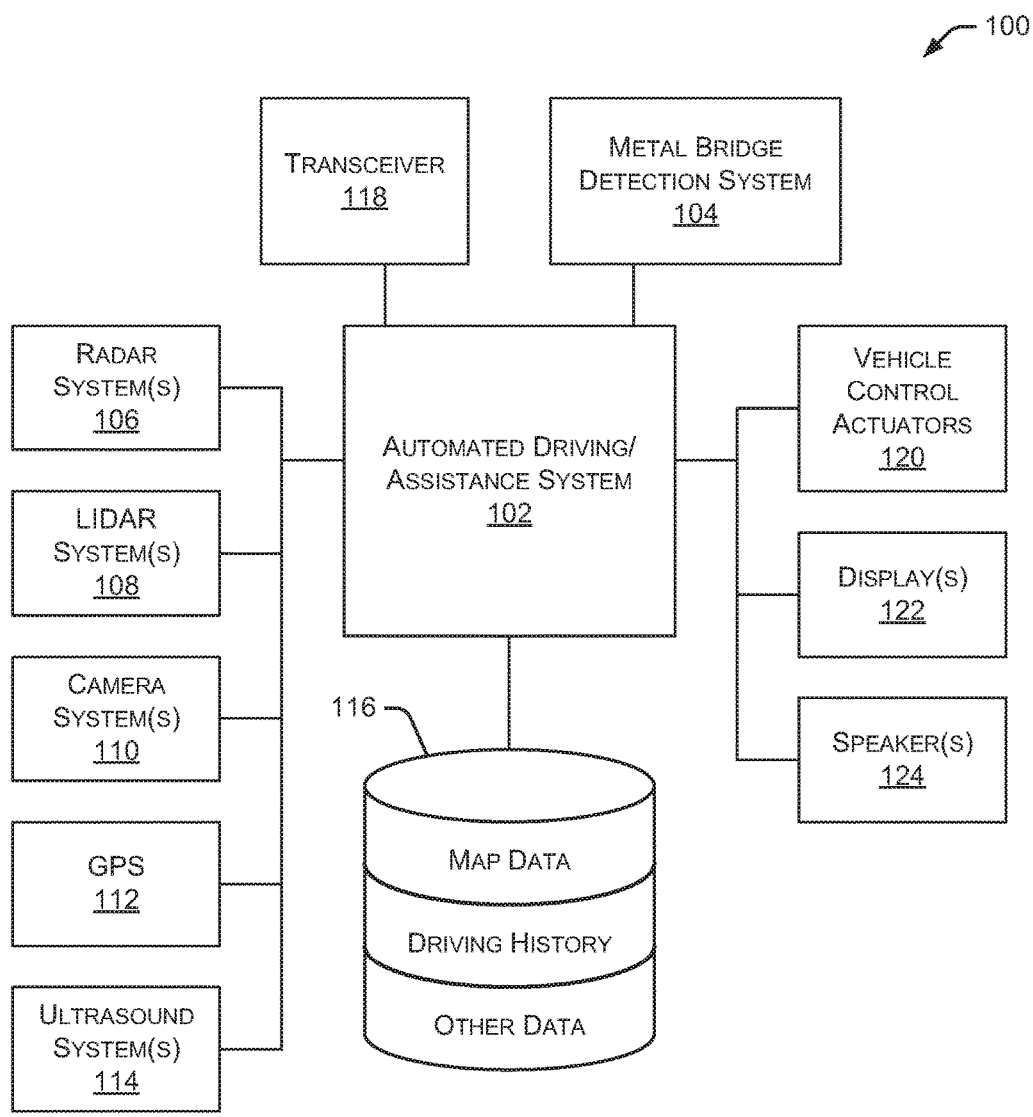
FIG. 1 is a block diagram illustrating an embodiment of a vehicle control system that includes a metal bridge detection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

Particular examples discussed herein refer to metal grate bridges or bridge surfaces having a metal grate. However, the systems and methods described herein are appropriate for detecting any type of metal bridge, or metal surface in the roadway, and taking appropriate actions to avoid the metal bridge or safely drive across the metal bridge.

FIG. 1 is a block diagram illustrating an embodiment of a vehicle control system 100 that includes a metal bridge detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes metal bridge detection system 104 that interacts with various components in the vehicle control system to detect and respond to a metal bridge near the vehicle. In one embodiment, metal bridge detection system 104 detects a metal bridge surface in the path of the vehicle (e.g., ahead of the vehicle) and adjusts one or more vehicle operations to avoid the metal bridge surface or allow the vehicle to safely drive across the metal surface of the bridge. Although metal bridge detection system 104 is shown as a separate component in FIG. 1, in alternate embodiments, metal bridge detection system 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. Additionally, data store 116 may store information related to metal bridges previously detected by the current vehicle or reported by other vehicles. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, bridge, parking lot, driveway or other location. For example, the automated driving/assistance system 102 may determine a path based on information or perception data provided by any of the components 106-118. A path may also be determined based on a route that maneuvers the vehicle around an approaching metal bridge surface in the roadway (e.g., by changing to a different roadway lane that does not have a metal surface). The sensor systems/devices 106-110 and 114 may be used to obtain real-time sensor data so that the automated driving/assistance system 102 can assist a driver or drive a vehicle in real-time.

Figure 2:
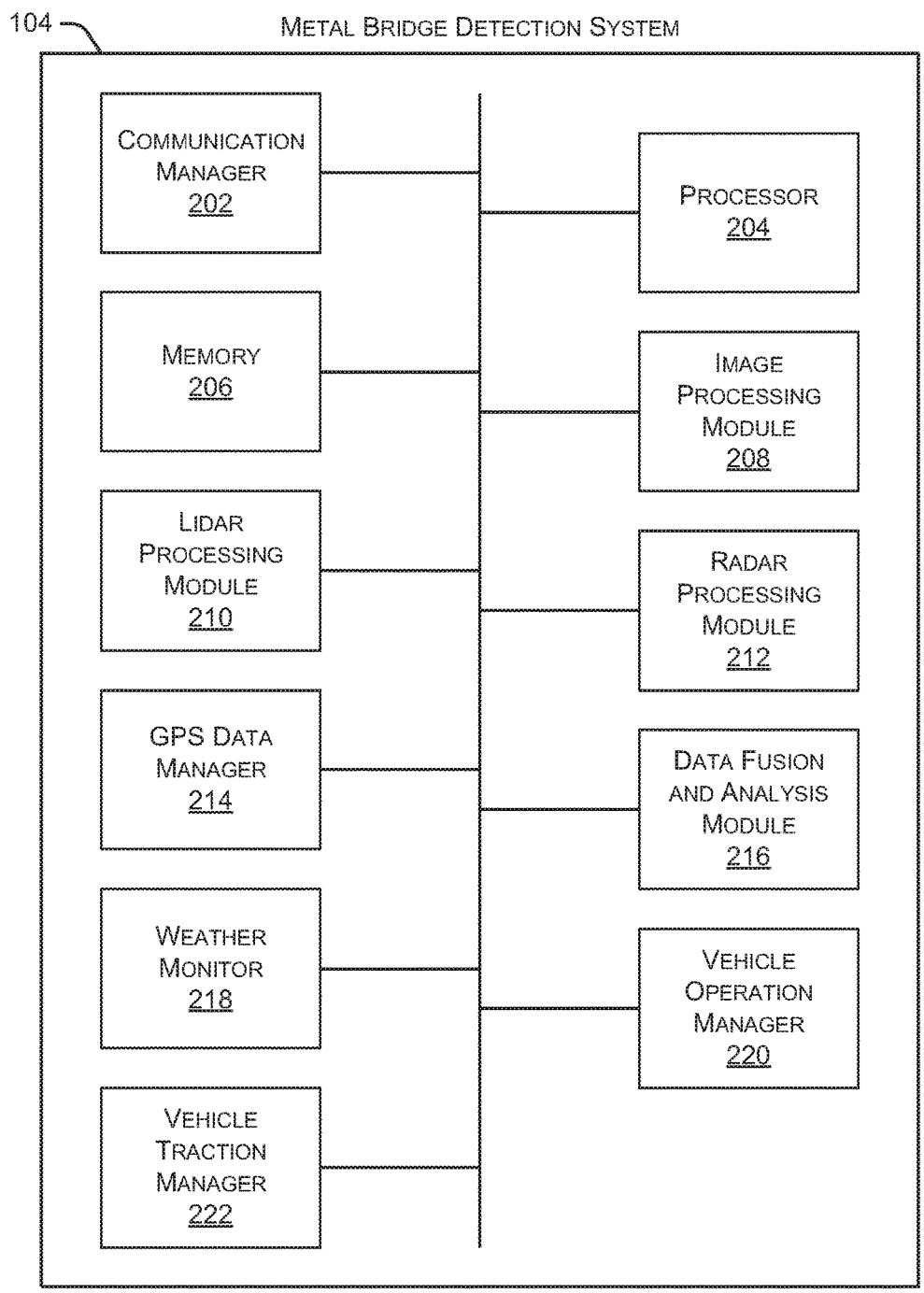
FIG. 2 is a block diagram illustrating an embodiment of a metal bridge detection system.

FIG. 2 is a block diagram illustrating an embodiment of metal bridge detection system 104. As shown in FIG. 2, metal bridge detection system 104 includes a communication manager 202, a processor 204, and a memory 206. Communication manager 202 allows metal bridge detection system 104 to communicate with other systems, such as automated driving/assistance system 102. Processor 204 executes various instructions to implement the functionality provided by metal bridge detection system 104 as discussed herein. Memory 206 stores these instructions as well as other data used by processor 204 and other modules and components contained in metal bridge detection system 104.

Additionally, metal bridge detection system 104 includes an image processing module 208 that receives image data from one or more camera systems 110 and identifies, for example, metal bridge surfaces in a roadway near the vehicle. In some embodiments, image processing module 208 includes a metal bridge detection algorithm that identifies a metal bridge surface in the images of the roadway ahead of the vehicle. A LIDAR processing module 210 receives LIDAR data from one or more LIDAR systems 108 and identifies, for example, a metal bridge surface in the roadway ahead of the vehicle. Similarly, a radar processing module 212 receives radar data from one or more radar systems 106 to identify, for example, metal bridge surfaces in the planned path of the vehicle.

Metal bridge detection system 104 also includes a GPS data manager 214 that receives, for example, map information from GPS 112 and other data sources, and vehicle drive history data from data store 116. In some embodiments, GPS data manager 214 uses the map information and vehicle drive history data to detect geographic locations where bridges are likely, such as near rivers, lakes, canyons, and the like. A data fusion and analysis module 216 performs various operations on data received from any number of sensors and/or data sources to detect the presence of a metal bridge near the vehicle, as discussed herein.

Additionally, metal bridge detection system 104 includes a weather monitor 218 that monitors weather conditions near the vehicle and receives weather-related data from any number of data sources. A vehicle operation manager 220 adjusts various vehicle operations based on the detection of a metal bridge surface, as discussed here. A vehicle traction manager 222 monitors a vehicle's traction between the vehicle's tires and the road surface (e.g., metal bridge surface) to detect any slippage or skidding of the tires. This slippage or skidding may indicate the presence of, for example, ice, snow, or frost on the surface of the roadway. In particular embodiments, vehicle traction manager 222 calculates the vehicle's longitudinal slip and adjusts the speed of the vehicle (e.g., slows the vehicle) to maintain a zero longitudinal slip (e.g., a non-skidding and non-spinning situation).

Figure 3:
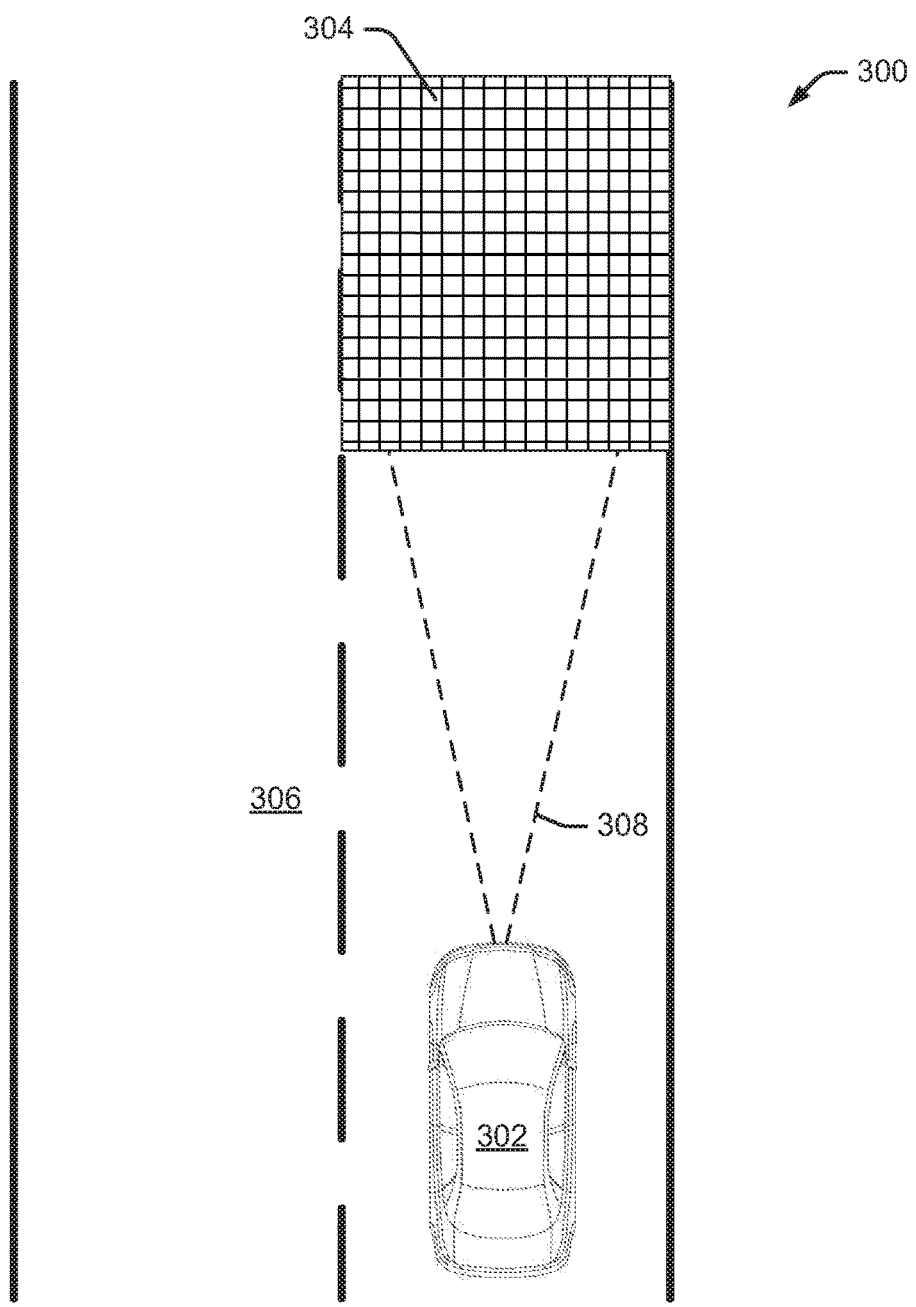
FIG. 3 illustrates an embodiment of vehicle approaching a metal surface on a bridge.

FIG. 3 illustrates an embodiment 300 of vehicle approaching a metal surface in a bridge. A vehicle 302 is traveling along a bridge (or roadway) 306 and is approaching a metal surface 304 in the bridge/roadway. One or more vehicle sensors (e.g., radar systems 106, LIDAR systems 108, and camera systems 110) may metal surface 304 as indicated by broken lines 308 representing the detection area identified by the sensors. In some embodiments, metal surface 304 has a grate configuration that is porous and allows air and water to pass through the metal surface. A particular bridge may have a metal surface with any type of metal grate configuration with apertures of any shape, orientation, size, and configuration. This grate configuration, along with the high thermal conductivity of metal, causes these metal surfaces to freeze quickly (e.g., faster than a concrete or asphalt surface freezes). Therefore, ice or snow may build-up on a metal surface of a bridge sooner than ice or snow builds up on a non-metal surface of the same bridge. So, the metal surface presents a higher driving risk, especially when weather conditions are appropriate for the creation of ice or snow.

As discussed herein, the described systems and methods adjust the operation of vehicle 302 to increase the likelihood that vehicle 302 maintains control as it drives across metal surface 304. In some embodiments, a bridge has multiple lanes for vehicles traveling in the same direction. One of the multiple lanes has metal surface 304, as discussed herein, while other lanes of the bridge have a concrete, asphalt, or any other type of surface. In these embodiments, if vehicle 302 senses metal surface 304 in the vehicle's current lane, vehicle 302 may change to another lane that has a concrete or asphalt surface, thereby avoiding the risk of diving over metal surface 304.

Figure 4:
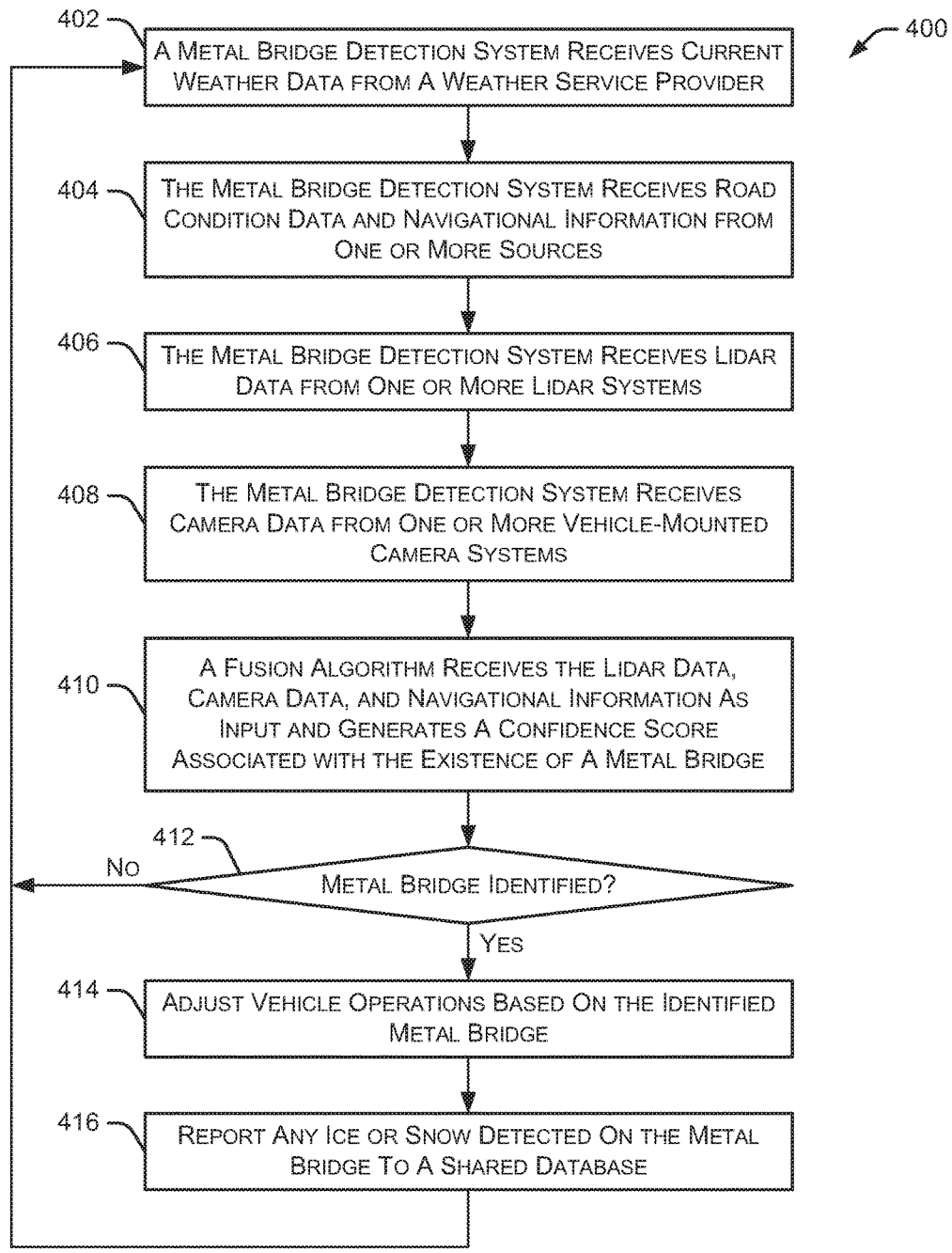
FIG. 4 illustrates an embodiment of a method for detecting a metal bridge.

FIG. 4 illustrates an embodiment of a method 400 for detecting a metal bridge or a metal surface in the roadway. Initially, a metal bridge detection system receives 402 current weather data from a weather service provider or other weather data source. In some embodiments, metal bridge detection system 104 is activated when weather conditions near the vehicle are likely to produce ice or snow on a road surface, including a bridge surface. For example, if the weather near the vehicle is sunny with temperatures significantly above freezing, it may not be necessary to operate metal bridge detection system 104. However, if the temperature drops closer to freezing and precipitation is detected (or predicted by the weather data), metal bridge detection system 104 may be activated to monitor the roadway for a metal bridge or a metal surface in the road.

Method 400 continues as metal bridge detection system 104 receives 404 road condition data and navigational information from one or more sources. The road condition data may be received from any number of data sources, such as travel data sources, weather data sources, other organizations, other vehicles, other individuals, and the like. Example road condition data may indicate a significant likelihood of road icing or reports of actual ice or snow in the roadway. The navigational information includes, for example, maps, road information and related data obtained from, for example, GPS 112 or obtained by the vehicle during previous driving activities. The navigational information may indicate the geographic location of bridges along a route being driven (or planned to be driven) by a vehicle.

Metal bridge detection system 104 receives 406 LIDAR data from one or more LIDAR systems 108. Additionally, metal bridge detection system 104 receives 408 camera data from one or more vehicle-mounted camera systems 110. A fusion algorithm receives 410 the LIDAR data, camera data, and navigational information as input, then generates a confidence score associated with the existence of a metal bridge near the vehicle. For example, if the fusion algorithm identifies a metal bridge using one type of data (such as LIDAR data) and confirms the detection of a metal bridge with a second type of data (such as camera data or navigational information), the fusion algorithm generates a high confidence score that a metal bridge exists near the vehicle. However, if only one type of data indicates the possibility of a metal bridge, the fusion algorithm will generate a lower confidence score.

In some embodiments, LIDAR data is particularly useful in identifying metal bridges and metal surfaces in the roadway because the depth information obtained by LIDAR systems can accurately detect metal grate bridges. Additionally, the intensity data obtained by LIDAR systems for metal bridges with ice is unique and can be distinguished from other types of road surfaces. The intensity data associated with the LIDAR data detecting metal grate bridges is high and helps determine the existence of a metal grate bridge with high confidence. For example, the LIDAR beam goes through the apertures in a metal grate bridge which creates a unique pattern in the returned signal.

The camera data can also determine the existence of a metal grate bridge ahead of a vehicle. Additionally, the camera data may detect ice or snow on the approaching metal grate bridge. As discussed herein, the fusion algorithm generates a confidence score based on the received LIDAR data, camera data, and navigational information. In some embodiments, the image data and LIDAR data is primarily associated with an area ahead of the vehicle (e.g., the area being approached by the vehicle). In other embodiments, the image data and LIDAR data is associated with areas to the side of the vehicle and/or areas behind the vehicle.

If a metal bridge is not identified 412, or is identified with a confidence score below a threshold value, method 400 returns to 402 and continues monitoring the approaching roadway for a metal bridge. If a metal bridge is identified 412, vehicle operations are adjusted 414 based on the identified metal bridge. As discussed in greater detail with respect to FIG. 5, vehicle operations are adjusted to avoid the metal surface in the roadway (if possible) or improve the control of the vehicle as it drives across the metal bridge. The existence of the metal bridge, as well as any ice or snow detected on the metal bridge, is reported 416 to a shared database (or other data storage mechanism) along with a geographic location associated with the metal bridge. This report represents road condition data that may be used by other vehicles traveling on the same road or traveling on other roads in the same area which may cross the metal bridge and experience similar ice or snow conditions. In some embodiments, the existence of the metal bridge and the geographic location of the bridge is also recorded in the vehicle's drive history.

In some embodiments, ice or snow is detected on a metal bridge by determining a current reflectivity of the roadway ahead of the vehicle and comparing the current reflectivity of the roadway surface to a previously recorded reflectivity of the roadway surface. The described systems and methods determine that ice or snow is present on the metal bridge if the current reflectivity of the roadway surface is greater than the previously recorded reflectivity of the roadway surface. The increased roadway surface reflectivity is attributed to a build-up of ice or snow on the metal bridge, causing greater reflectivity than a non-icy roadway surface. In some embodiments, the reflectivity includes one or more of: visual reflectivity, LIDAR reflectivity, and radar reflectivity.

In particular embodiments, LIDAR data is used to determine regions of interest ahead of a vehicle. These regions of interest are likely to contain a metal bridge based on analysis of the LIDAR data. Metal bridge detection system 104 provides these regions of interest to a camera system and instructs the camera system to focus on the regions of interest to detect (e.g., confirm) the presence of a metal bridge. This confirmation by the camera system provides an increased confidence level associated with the detection of a metal bridge.

Figure 5:
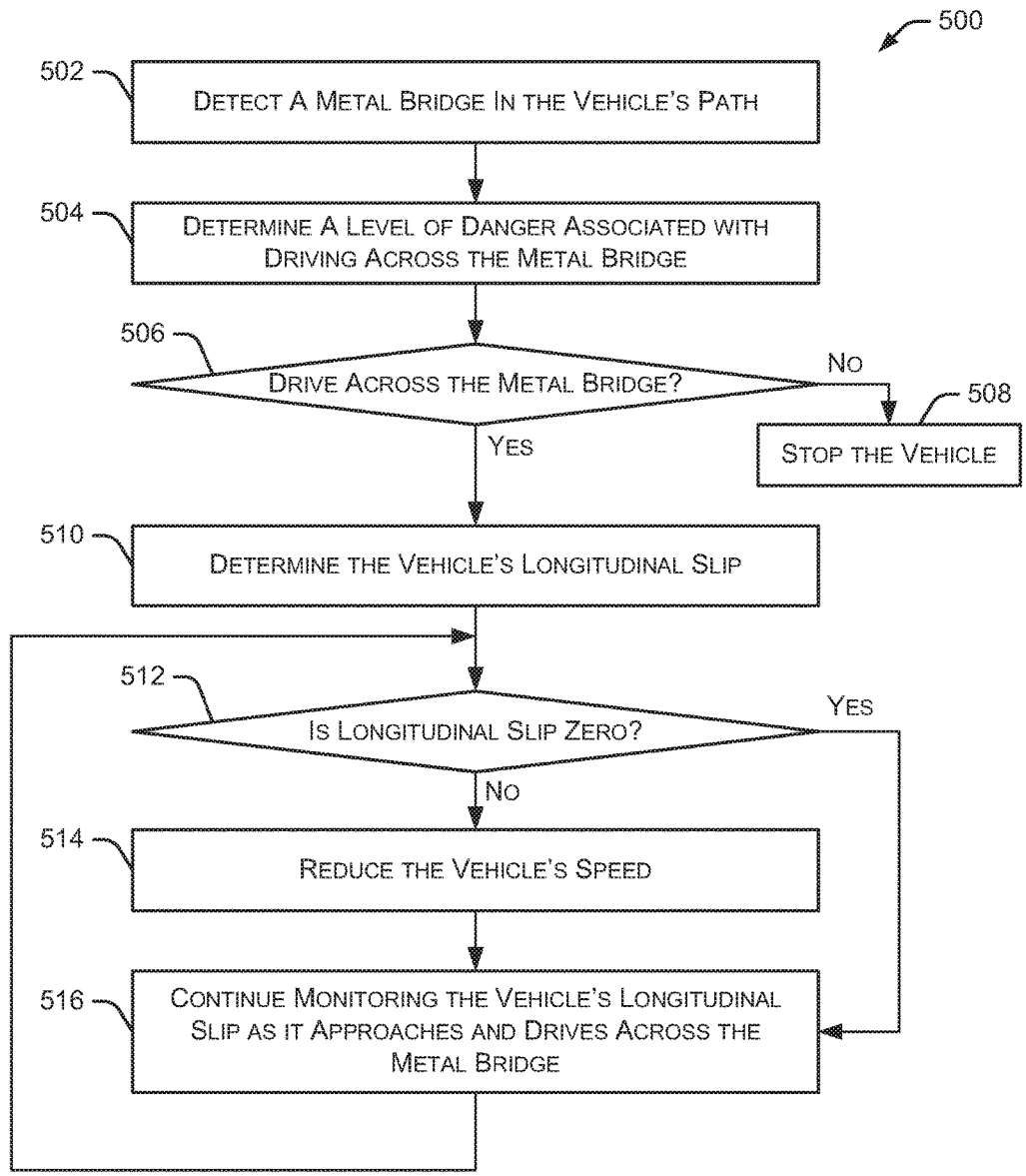
FIG. 5 illustrates an embodiment of a method for adjusting vehicle operations in response to detecting a metal bridge.

FIG. 5 illustrates an embodiment of a method 500 for adjusting vehicle operations in response to detecting a metal bridge. Initially, metal bridge detection system 104 detects 502 a metal bridge in the path of a vehicle as discussed, for example, with respect to FIG. 4. Method 500 then determines 504 a level of danger associated with driving across the metal bridge. The level of danger may include any number of different factors, such as weather reports, temperature sensor data, LIDAR detection of a metal grate, map indication of a bridge, indication of ice by camera, LIDAR and/or radar sensors, snow on the bridge or roadway, and the like. Each of these factors may have an associated certainty and an associated weight. In some embodiments, the certainties and/or weights of the multiple factors are combined to determine a particular level of danger. Based on the level of danger, the method determines 506 whether to drive across the metal bridge. For example, if the level of danger exceeds a threshold value (e.g., indicating a high level of danger), the method determines 506 not to drive across the metal bridge. In this situation, metal bridge detection system 104, in combination with automated driving/assistance system 102, stops 508 the vehicle to avoid the dangerous activity of driving across the metal bridge. In some embodiments, the metal bridge may have at least one driving lane that is not metal (e.g., a concrete or asphalt driving lane). In these embodiments, the method may cause the vehicle to change to a different driving lane to avoid the metal portion of the roadway.

If the level of danger does not exceed a threshold value (or the method otherwise determines that the vehicle an safely cross the metal bridge), method 500 determines 510 the vehicle's longitudinal slip. The longitudinal slip of a vehicle is a good representation of vehicle safety as the vehicle drives across a slippery surface, such as a wet or icy metal bridge. Longitudinal slip is typically represented as a percentage of the difference between the road surface speed compared to the wheel speed. For example:

$$\text{Slip} = (wr-v)/v$$

Where w is the lateral component of the rotational speed of the wheel, r is the wheel radius at the point of contact with the roadway, and v is the vehicle speed. A positive longitudinal slip indicates that the vehicle wheels are spinning while a negative longitudinal slip indicates that the wheels are skidding. To prevent the vehicle from skidding or spinning over ice or other slippery surface, the described systems and methods may use information about an upcoming metal bridge to reduce the vehicle's speed before it drives across the metal bridge.

Referring again to FIG. 5, method 500 determines 512 whether the longitudinal slip is zero. If the longitudinal slip is not zero (e.g., the longitudinal slip is negative or positive), the method reduces 514 the vehicle's speed and continues monitoring 516 the vehicle's longitudinal slip as it approaches and drives across the metal bridge. As long as the longitudinal slip of the vehicle remains zero, the system continues to monitor the longitudinal slip and makes speed adjustments if the longitudinal slip becomes positive or negative. In some embodiments, the described systems and methods make other adjustments to the vehicle or perform other operations to maintain a zero longitudinal slip. In particular embodiments, the other adjustments may include adjustments to the vehicle throttle, braking systems, and/or steering systems, as needed, to maintain control of the vehicle.

In some embodiments, the adjustments discussed with respect to FIG. 5 are implemented by sending appropriate instructions to one or more vehicle control actuators 120. For example, instructions may be sent to vehicle control actuators 120 to control braking, While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
receiving first weather data;
(a) determining that the first weather data indicates a likelihood of ice or snow proximate the vehicle;
in response to (a) activating a metal bridge detection system and performing, by the metal bridge detection system:
  (i) receiving LIDAR data from a LIDAR system mounted to a vehicle;
  (ii) receiving camera data from a camera system mounted to the vehicle;
  (iii) analyzing the received LIDAR data and the camera data to identify a metal bridge proximate the vehicle; and
  (iv) responsive to identifying a metal bridge proximate the vehicle, adjusting vehicle operations to improve vehicle control as it drives across the metal bridge;
receiving second weather data;
(b) determining that the second weather data does not indicate a likelihood of ice or snow proximate the vehicle; and
in response to (b) deactivating the metal bridge detection system and refraining from performing (i)-(iv) using the metal bridge detection system.

2. The method of claim 1, further comprising receiving navigational information that indicates the existence of a bridge ahead of the vehicle.

3. The method of claim 1, further comprising reporting the existence of the metal bridge to a shared database.

4. The method of claim 3, wherein reporting the existence of the metal bridge to a shared database includes reporting a geographic location associated with the metal bridge.

5. The method of claim 1, wherein adjusting vehicle operations includes:
determining the vehicle's longitudinal slip; and
responsive to determining a non-zero longitudinal slip, reducing the speed of the vehicle until the longitudinal slip is zero.

6. The method of claim 1, wherein the metal bridge is a metal grate bridge.

7. The method of claim 6, wherein at least a portion of the metal grate bridge includes a metal road surface that has apertures therethrough.

8. The method of claim 6, wherein at least a portion of the metal grate bridge includes a metal road surface, and wherein adjusting vehicle operations includes steering the vehicle to a different lane that does not include a metal road surface.

9. The method of claim 1, wherein the vehicle is an autonomous vehicle.

10. A method comprising:
receiving LIDAR data from a LIDAR system mounted to a vehicle;
receiving camera data from a camera system mounted to the vehicle;
receiving first weather data;
(a) determining that the first weather data indicates a likelihood of ice or snow proximate the vehicle;
in response to (a) activating a metal bridge detection system and performing, by a metal bridge detection system:
  (i) analyzing the received LIDAR data and the camera data to identify a metal bridge proximate the vehicle; and
  (ii) responsive to identifying a metal bridge proximate the vehicle:
    determining a longitudinal slip associated with the vehicle; and
    responsive to determining a non-zero longitudinal slip, reducing a speed of the vehicle;
receiving second weather data;
(b) determining that the second weather data does not indicate a likelihood of ice or snow proximate the vehicle; and
in response to (b) deactivating the metal bridge detection system and refraining from performing (i) and (ii) using the metal bridge detection system.

11. The method of claim 10, wherein reducing a speed of the vehicle includes reducing a speed of the vehicle until a non-zero longitudinal slip is achieved.

12. The method of claim 10, further comprising receiving navigational information that indicates the existence of a bridge ahead of the vehicle.

13. The method of claim 10, further comprising reporting the existence of the metal bridge to a shared database.

14. The method of claim 10, wherein the metal bridge is a metal grate bridge, and wherein at least a portion of the metal grate bridge includes a metal road surface that has apertures therethrough.

15. An apparatus comprising:
a LIDAR system configured to capture LIDAR data associated with an area proximate the vehicle;
a camera configured to capture camera data associated with the area proximate the vehicle; and
a metal bridge detection system configured to analyze the LIDAR data and the camera data to identify a metal bridge proximate the vehicle, wherein the metal bridge detection system is further configured to adjust, responsive to identifying a metal bridge, vehicle operations to improve vehicle control as the vehicle drives across the metal bridge;
a controller programmed to:
receive weather data;
evaluate whether that weather data indicates a likelihood of ice or snow proximate the vehicle;
if the weather data indicates the likelihood of ice and snow proximate the vehicle, enable the metal bridge detection system; and
if the weather data does not indicate the likelihood of ice and snow proximate the vehicle, deactivate the metal bridge detection system.

16. The apparatus of claim 15, wherein the metal bridge detection system includes a vehicle traction manager configured to determine a longitudinal slip associated with the vehicle and adjust the vehicle's speed if the longitudinal slip is not zero.

17. The apparatus of claim 15, further comprising a vehicle control actuator configured to perform the at least one vehicle operation by adjust the vehicle's steering or braking systems.

18. The apparatus of claim 15, wherein the metal bridge detection system is coupled to an automated driving system.

\* \* \* \* \*